(12) United States Patent
Spyker et al.

(10) Patent No.: US 10,366,105 B2
(45) Date of Patent: *Jul. 30, 2019

(54) REPLICATING STRUCTURED QUERY LANGUAGE (SQL) IN A HETEROGENEOUS REPLICATION ENVIRONMENT

(71) Applicant: INTERNATIONAL BUSINESS MACHINES CORPORATION, Armonk, NY (US)

(72) Inventors: James D. Spyker, Toronto (CA); Victor L. Szabo, Stoffville (CA); Yongfeng Yao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,488

(22) Filed: May 5, 2017

(65) Prior Publication Data

US 2017/0242905 A1 Aug. 24, 2017

Related U.S. Application Data

(63) Continuation of application No. 14/865,559, filed on Sep. 25, 2015.

(51) Int. Cl.
*G06F 16/00* (2019.01)
*G06F 16/27* (2019.01)
(Continued)

(52) U.S. Cl.
CPC ........ *G06F 16/273* (2019.01); *G06F 16/2246* (2019.01); *G06F 16/258* (2019.01)

(58) Field of Classification Search
CPC ........ G06F 16/25; G06F 16/27; G06F 16/242; G06F 16/245; G06F 16/258;
(Continued)

(56) References Cited

U.S. PATENT DOCUMENTS 5,694,591 A * 12/1997 Du ............... G06F 16/2471
707/999.002
5,768,564 A * 6/1998 Andrews ............ G06F 8/33
707/999.101
(Continued)

FOREIGN PATENT DOCUMENTS

CN 101187888 A 5/2008
WO 2012018424 A2 2/2012

OTHER PUBLICATIONS

IBM: List of IBM Patents or Patent Applications Treated As Related (Appendix P), May 11, 2017, 2 pages.
(Continued)

*Primary Examiner* — Ashish Thomas
*Assistant Examiner* — Rezwanul Mahmood
(74) *Attorney, Agent, or Firm* — Teddi E. Maranzano (57) ABSTRACT

A processor-implemented method for replicating structured query language (SQL) in a heterogeneous replication environment is provided. The method includes receiving a first statement for a multi-row operation, whereby the multi-row operation is directed to one or more tables of a database, and whereby the first statement includes a text of a SQL statement in a DBMS transaction log. The method also provides for evaluating whether to create a source tree structure from the received first statement. In response to creating the source tree structure, the method evaluates whether the source tree structure is transformable. The method transforms the source tree structure to a target tree structure in response to evaluating that the source tree structure is transformable.

3 Claims, 3 Drawing Sheets (51) Int. Cl.
*G06F 16/25* (2019.01)
*G06F 16/22* (2019.01)

(58) Field of Classification Search
CPC .............. G06F 16/273; G06F 16/2246; G06F 16/2264; G06F 16/2428; G06F 16/2455; G06F 16/2465; G06F 16/24526; G06F 16/24532; G06F 16/24542
See application file for complete search history.

(56) References Cited

U.S. PATENT DOCUMENTS

| | | | | |
|---|---|---|---|---|
| 6,748,377 | B1* | 6/2004 | Attaluri | G06F 16/24537 707/999.005 |
| 7,668,877 | B1 | 2/2010 | Narayanaswamy | |
| 7,941,384 | B2* | 5/2011 | Gilman | G06F 16/254 706/25 |
| 8,605,722 | B1* | 12/2013 | Sindhu | H04L 45/16 370/390 |
| 8,631,034 | B1* | 1/2014 | Peloski | G06F 17/5009 707/770 |
| 9,361,302 | B1* | 6/2016 | Mao | G06F 11/14 |
| 9,430,114 | B1* | 8/2016 | Dingman | G06F 16/211 |
| 9,928,281 | B2* | 3/2018 | Bourbonnais | G06F 16/2462 |
| 2002/0023097 | A1* | 2/2002 | Ripley | G06F 16/88 707/999.003 |
| 2002/0055932 | A1* | 5/2002 | Wheeler | G06F 16/25 707/999.104 |
| 2003/0037029 | A1* | 2/2003 | Holenstein | G06F 16/2343 707/999.001 |
| 2003/0065686 | A1* | 4/2003 | Callahan | G06F 9/526 707/999.2 |
| 2003/0093755 | A1* | 5/2003 | O'Carroll | G06F 17/218 715/205 |
| 2004/0034616 | A1* | 2/2004 | Witkowski | G06F 16/283 707/999.001 |
| 2004/0049737 | A1* | 3/2004 | Simon Hunt | G06F 16/9577 707/E17.121 |
| 2004/0133848 | A1* | 7/2004 | Hunt | G06F 16/9577 707/E17.121 |
| 2004/0172442 | A1* | 9/2004 | Ripley | G06F 16/90344 707/E17.012 |
| 2005/0114285 | A1* | 5/2005 | Cincotta | G06F 16/27 707/999.001 |
| 2005/0138052 | A1* | 6/2005 | Zhou | G06F 16/284 707/999.101 |
| 2006/0173865 | A1* | 8/2006 | Fong | G06F 17/2264 707/999.1 |
| 2006/0173873 | A1* | 8/2006 | Prompt | G06F 16/284 707/999.1 |
| 2006/0190503 | A1* | 8/2006 | Naicken | G06F 16/27 707/999.204 |
| 2006/0218123 | A1* | 9/2006 | Chowdhuri | G06F 16/24532 707/999.002 |
| 2007/0027905 | A1* | 2/2007 | Warren | G06F 8/51 707/999.103 |
| 2007/0078812 | A1* | 4/2007 | Waingold | G06F 16/24542 707/999.002 |
| 2007/0260571 | A1* | 11/2007 | Mansfield | G06F 17/227 706/48 |
| 2008/0065590 | A1* | 3/2008 | Castro | G06F 16/24542 707/999.002 |
| 2008/0228697 | A1* | 9/2008 | Adya | G06F 16/27 707/999.002 |
| 2009/0100082 | A1* | 4/2009 | Kogan | G06F 16/24561 707/999.101 |
| 2009/0112908 | A1* | 4/2009 | Wintel | G06F 16/27 707/999.102 |
| 2009/0240487 | A1* | 9/2009 | Shen | G06F 17/2872 704/9 |
| 2009/0327208 | A1* | 12/2009 | Bittner | G06F 16/24564 706/61 |
| 2010/0030730 | A1 | 2/2010 | Shang et al. | |
| 2010/0057764 | A1* | 3/2010 | Williamson | G06F 16/242 707/E17.05 |
| 2011/0173619 | A1 | 7/2011 | Fish | |
| 2011/0246503 | A1* | 10/2011 | Bender | G06F 9/546 707/769 |
| 2012/0059863 | A1* | 3/2012 | Thomson | G06F 16/248 707/805 |
| 2013/0318126 | A1* | 11/2013 | Graefe | G06F 16/2246 707/797 |
| 2014/0032617 | A1* | 1/2014 | Stanfill | G06F 16/25 707/809 |
| 2014/0046638 | A1* | 2/2014 | Peloski | G06F 17/5009 703/6 |
| 2014/0089294 | A1* | 3/2014 | Shankar | G06F 16/24524 707/718 |
| 2014/0136498 | A1* | 5/2014 | Finis | G06F 16/219 707/695 |
| 2014/0143205 | A1* | 5/2014 | Leshchiner | G06F 16/27 707/626 |
| 2014/0201838 | A1* | 7/2014 | Varsanyi | G06F 21/552 726/23 |
| 2014/0214897 | A1* | 7/2014 | Zhu | G06F 16/2455 707/771 |
| 2014/0280030 | A1* | 9/2014 | Freedman | G06F 16/24542 707/718 |
| 2014/0282444 | A1* | 9/2014 | Araya | G06F 8/42 717/143 |
| 2015/0046464 | A1* | 2/2015 | Raiber | G06F 16/2246 707/741 |
| 2015/0347401 | A1* | 12/2015 | Raghavan | G06F 16/214 707/809 |
| 2015/0363469 | A1* | 12/2015 | Peloski | G06F 16/24568 707/741 |
| 2016/0063063 | A1* | 3/2016 | Tsai | G06F 16/284 707/755 |
| 2016/0203050 | A1* | 7/2016 | Hrle | G06F 11/1402 707/625 |
| 2017/0091298 | A1* | 3/2017 | Spyker | G06F 16/273 |
| 2017/0242905 | A1* | 8/2017 | Spyker | G06F 16/273 |

OTHER PUBLICATIONS

IBM, "Optimizing Data Integration Jobs Across Heterogeneous Data Environments," ip.com, IP.com No. 000191087, IP.com Electronic Publication: Dec. 15, 2009, 6 pages.
Chang et al., "Building Parameterized Canonical Representations to Achieve Interoperability among Heterogeneous Databases," Department of Computer Science, University of Maryland, College Park, MD 20742, 1995, 15 pages.
Microsoft, "SQL Server 2014," http://www.microsoft.com/en-us/server-cloud/products/sql-server/Overview.aspx, printed on Sep. 18, 2015, pp. 1-9.

* cited by examiner

REPLICATING STRUCTURED QUERY LANGUAGE (SQL) IN A HETEROGENEOUS REPLICATION ENVIRONMENT

BACKGROUND

In a heterogeneous environment the source and target database management systems (DBMS) can differ by several criteria, including release versions of the same database product, and by computer architectures hosting the source and target DBMS.

In general, data replication refers to capturing changes made to a source, such as a database or file, and transmitting them to a target where they are applied, thereby creating a copy of the source. The target can be used in workload balancing, such as offloading read-only SQL operations from the source database. The target can also become the new source in a disaster recovery solution if the source becomes unavailable during an unrecoverable computer hardware failure.

A multi-row SQL statement, such as UPDATE or DELETE, is one that affects many rows. Generally, a database management system (DBMS) may determine that executing the multi-row SQL statement is more efficient than the corresponding series of individual SQL statements. However in a heterogeneous replication environment, the target DBMS may not fully implement the syntax of a complex multi-row SQL statement, as implemented by the source DBMS. Even if the multi-row SQL statement is supported at the target DBMS, the multi-row SQL statement is not directly executable at the target DBMS if data transformation between the source and target DBMSs is required. Transformation refers to substituting values associated with the columns of the tables of the source DMS into the corresponding columns of the tables of the target DBMS. Consequently, the source DBMS constructs the corresponding series of individual SQL statements, which are transmitted to the target DBMS where they are subsequently applied. Generating multiple individual SQL statements impacts performance on the source DBMS since as each SQL statement is analyzed, CPU cycles are diverted from processing transactions to generating and transmitting the multiple SQL statements to the target DBMS. Additionally, data replication performed in this way can increase the risk of data loss when transmission of replication SQL statements to the target database fails to complete.

SUMMARY

According to one embodiment, a processor-implemented method for replicating structured query language (SQL) in a heterogeneous replication environment is provided. The method includes receiving a first statement for a multi-row operation, whereby the multi-row operation is directed to one or more tables of a database, and whereby the first statement includes a text of a SQL statement in a database management system (DBMS) transaction log. The method also provides for evaluating whether to create a source tree structure from the received first statement. In response to creating the source tree structure, the method evaluates whether the source tree structure is transformable. The method transforms the source tree structure to a target tree structure in response to evaluating that the source tree structure is transformable.

According to another embodiment, a computer program product for replicating structured query language (SQL) in a heterogeneous replication environment is provided. The method provides a database management system (DBMS) embodied on a computer readable storage medium, the DBMS including program instructions executable by a processor. The program instructions include program instructions to receive a first statement for a multi-row operation, whereby the multi-row operation is directed to one or more tables of a database, and whereby the first statement includes a text of a SQL statement in a DBMS transaction log. The computer program product further provides program instructions to evaluate whether to create a source tree structure from the received first statement. In response to creating the source tree structure, program instructions evaluate whether the source tree structure is transformable. The computer program product provides program instructions to transform the source tree structure to a target tree structure in response to evaluating that the source tree structure is transformable.

According to another embodiment, a computer system for replicating structured query language (SQL) in a heterogeneous replication environment is provided. The computer system provides one or more processors, one or more computer-readable storage devices, and a plurality of program instructions stored on at least one of the one or more storage devices for execution by at least one of the one or more processors. The computer system provides program instructions to receive a first statement for a multi-row operation, whereby the multi-row operation is directed to one or more tables of a database, and whereby the first statement includes a text of a SQL statement in a DBMS transaction log. The computer system provides program instructions to evaluate whether to create a source tree structure from the received first statement. In response to creating the source tree structure, program instructions evaluate whether the source tree structure is transformable. The computer system provides program instructions to transform the source tree structure to a target tree structure in response to evaluating that the source tree structure is transformable.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As used hereinafter, a database management system (DBMS) refers to the software modules, components, and structures that cooperate as a system to catalog, organize, and retrieve data. A database, as used hereinafter, is a DBMS structure where data and the catalog information that organizes the data, is stored. A DBMS may include multiple databases. In general, database replication refers to the technical field whereby data is replicated, i.e., copied, between two or more databases. A stand-alone product that is separate from, and is in addition to, the DBMS product may perform the database replication. The same vendor that provides the DBMS may provide the database replication product. However, a different vendor may provide the database replication product. In either case, the database replication product cooperates with the DBMS to replicate changes in a source database to one or more target databases. Alternatively, a component of the DBMS may perform the database replication. As used hereinafter, database replication refers to data replication, whether performed by a separate stand-alone product or by a component of the DBMS.

Embodiments of the present invention relate generally to the field of computers, and more particularly to replicating structured query language (SQL). The following described exemplary embodiments provide a system, method and program product to, among other things, replicate SQL in a heterogeneous environment. Therefore, the present embodiment has the capacity to improve the technical field of database replication in a heterogeneous environment by providing a replication method for SQL in a heterogeneous environment whereby the source DBMS transforms the multi-row SQL statement into a multi-row SQL statement that is syntactically compatible with the target DBMS, and whereby the target DBMS receives and executes the compatible multi-row SQL statement. The compatible multi-row SQL statement reflects any transformations performed by the source DBMS to achieve compatibility with the target DBMS.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
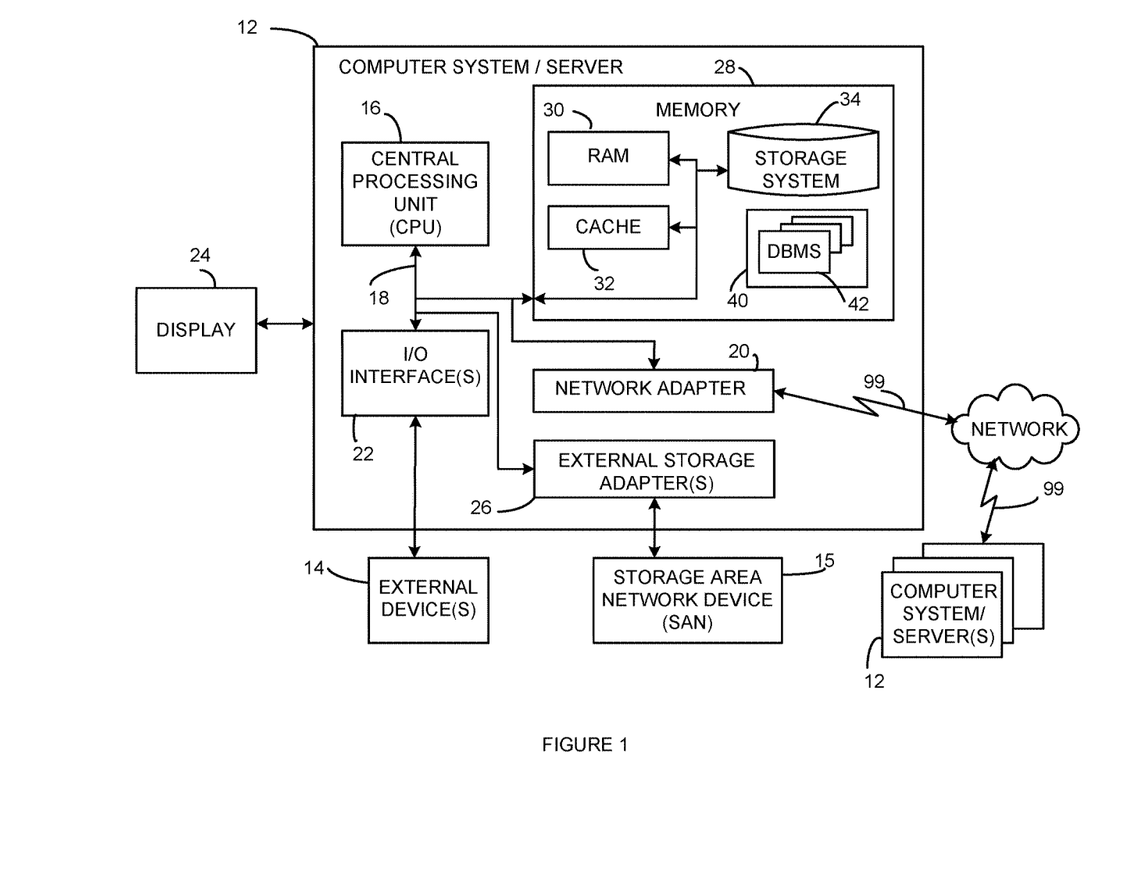
FIG. 1 illustrates an exemplary computer system environment operable for various embodiments of the disclosure.

FIG. 1 illustrates a block diagram of an exemplary computer system (i.e., server) 12 operable for various embodiments of the disclosure. As shown, the server 12 is only one example of a suitable computer for hosting and replicating DBMS data in a heterogeneous environment and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules, components, objects, logic, or data structures, for example, being executed by the processing unit 16 to control the operation of the server 12. The SQL replication operations can be implemented as a specialized component of a DBMS 42. At least a portion of the OS 40 and the SQL replication operations of the DBMS 42 may be specialized to execute the algorithm of FIG. 2.

In a distributed computing environment, such as a cloud computing environment, each participating server 12 may be under the control of an OS 40 residing on each local and remote server 12, respectively.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The DBMS 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

External storage adapter 26 connects the server 12 with external storage subsystems, such as a storage area network (SAN) 15. A portion of SAN 15 or the storage system 34 may be reserved for DBMS 42 data and control structure storage, such as the DBMS system catalog. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
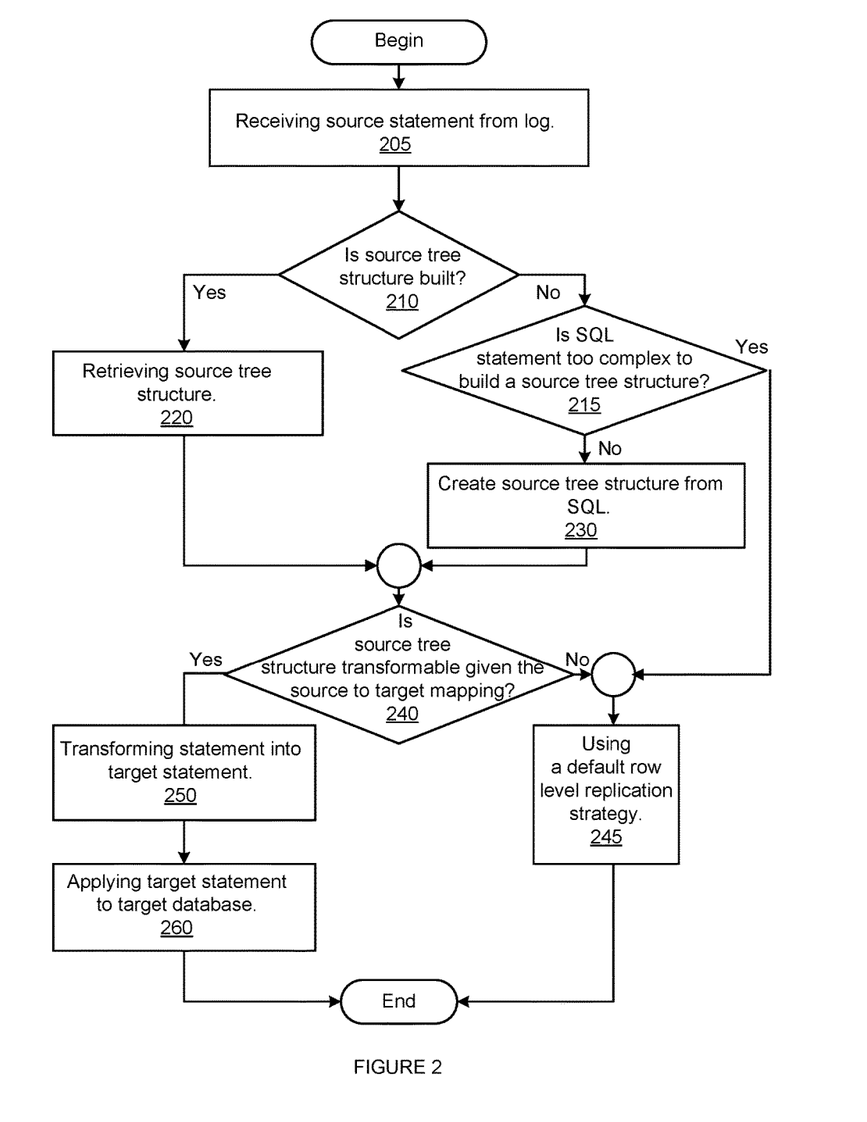
FIG. 2 illustrates an operational flow chart for replicating structured query language (SQL) operations across heterogeneous replication environments, according to various embodiments of the disclosure.

FIG. 2 illustrates components and algorithms associated with replicating multi-row SQL statements in heterogeneous replication environments. A heterogeneous replication environment is one in which the source and target DBMS s may differ by operating system architecture or version, host server architecture, or DBMS vendor, among other factors. At 205 on the source DBMS, database replication receives a description of a statement, such as an UPDATE or a DELETE statement, from a transaction log on the source DBMS for replication to the target DBMS. Through database replication, modifications and additions to data in the various source DBMS tables are reflected in the corresponding tables of the target DBMS.

Embodiments of the present invention are described with specific reference to the following UPDATE SQL statement. In one embodiment, at 210 the actual SQL statement may be present in the transaction log in its text form, as in the following example:

UPDATE SOURCETABLE SET $A=7, B=9, C=C+2$
WHERE $A<1$ AND $(B=3$ OR $C>=B+7)$

In another embodiment, at 210 the SQL statement may be present in the transaction log as a source tree structure with all leafs being individual evaluations and each fork in the source tree being either an AND or OR operation. In this form, the SQL source tree structure can be extracted from the transaction log and directly transformed into a target SQL statement. In a further embodiment, the SQL statement may be stored in a DBMS catalog structure in source tree structure form where it can be extracted and directly transformed to a target SQL statement. The source tree structure, also referred to as the canonical form, is a logical representation of the SQL statement such that the source tree structure can be used to generate an SQL statement in a syntax understood by another database, such as the target database.

In the example UPDATE statement, the SET clause specifies the values, i.e., "7", "9", and "increment by 2", to use to perform the update operation on the specified columns, i.e., A, B, and C, of the table, SOURCETABLE. The WHERE clause specifies the conditions under which the updating should occur, i.e., A<1, AND, (B=3 OR C>=B+7). The WHERE clause is a set of evaluations for individual columns against constant data values or simple expressions involving other columns. These evaluations can involve the relational operators as shown in Table 1:

TABLE 1

Relational Operators

| Relational Operator | Meaning |
|---|---|
| > | Greater than |
| >= | Greater than or equal to |
| < | Less than |
| <= | Less than or equal to |
| = | Equal to |

These individual relational operators can be connected using AND and OR operators and can be grouped together using brackets, parentheses, or other mechanisms specific to the syntax of the DBMS.

At 220, database replication retrieves the source tree structure, if present, from the transaction log or the DBMS catalog structure. If the source tree structure is not already built, at 215 database replication evaluates whether the SQL statement is too complex for building a source tree structure, and therefore uses the default row level replication strategy for the source DBMS. For example, the SQL LIKE condition operator of a WHERE clause is used to search for a specified pattern in a column. However, the target DBMS may either not support the LIKE operator or the target DBMS may interpret it differently from the source DBMS. Because of the potential ambiguity, database replication may determine that creating a canonical source tree structure is not possible, and replicate the statement using the default row level replication strategy for the source DBMS (step 245). In another embodiment, the source DBMS can provide an estimate of the number of rows affected by the SQL statement. This information need not be entirely accurate, since it is being used as a heuristic in determining whether to use heterogeneous SQL replication or the DBMS default row level replication strategy. The actual number of affected rows is not known until after the SQL statement completes. However in preparation for actual execution, the DBMS creates a query plan, whereby the SQL statement is optimized for performance. The DBMS may estimate the affected number of rows and store this value as part of the query plan. In another embodiment, this heuristic of an estimated number of affected rows is a configurable value that can be input as a DBMS tuning parameter and suggest to database replication which replication method to choose, based on comparing the heuristic to the estimated query plan results.

At 230, if database replication determines that the SQL statement is not too complex, database replication creates the source tree structure from the SQL statement. The corresponding source tree structure for the SET clause can be represented as:

$[[A,7],[B,9],[C,\text{expr}(C,+,2)]]$.

The corresponding source tree for the WHERE clause can be represented as:

$[A,<,1]$

AND $[B,=,3]$

OR $[C,>=,\text{expr}(B,\text{"+"},7)]$.

At 240 database replication determines whether the source tree structure is transformable, given the source to target DBMS mapping. Transformation refers to substituting values associated with the columns of the tables of the source DMS into the corresponding columns of the tables of the target DBMS. Database replication determines the mapping for each column in the source SQL statement to a column in the target DBMS. Transformations can involve simple arithmetic operations involving a constant, as in the following three examples:

TargetA=SourceA,

TargetA=SourceA*2

TargetA=SourceA-7

If any of the source columns either are not mapped to a corresponding column in the target DBMS, or are mapped using more complex transformations, then database replication may apply the default row level replication strategy to the SQL statement (step 245).

Examples of complex transformational mappings include those statements containing concatenation of columns, as in TargetA=CONCAT(SourceA, SourceB), or a user-defined function, as in TargetA=UserExit(SourceA). In the CONCAT example, since information is lost in the transformation. For example, the result in TargetA is the same value, i.e., "first and second", whether SourceA contains the value "first and" and SourceB contains the value "second" or whether SourceA contains the value "first" and SourceB contains the value "and second". Thus, an evaluation to identify only the rows where SourceA contains the value "first" is not possible using CONCAT.

A user-defined function programmatically extends the capability of the DBMS by adding functionality that can be evaluated using a combination of SQL statements and a common program language, such as C and Java. However, since the program instructions in the user-defined function may be beyond the capabilities of the DBMS to evaluate, database replication may apply the default row level replication strategy.

If database replication determines that the source tree structure is not transformable, at 245 database replication may apply the default row level replication strategy to the SQL statement. If the source tree structure is transformable, given the source to target mapping, at 250 database replication transforms the source tree structure into the target SQL statement. Referring again to the previous UPDATE statement example, source table columns A, B, and C are mapped to target table columns D, E, and F as follows:

$D=A$ $E=B*2$ $F=C-3$

The source WHERE clause:

$[A,<,1]$

AND $[B,=,3]$

OR $[C,>=,expr(B,"+",7)]$ transforms into:

$[D,<,1]$

AND $[E,=,3*2]$

OR $[F,>=,(expr(expr(E,"/",2),"+",7),"-",3)]$ which can be mathematically simplified to:

$[D,<,1]$

AND $[E,=,6]$

OR $[F,>=,expr(expr(E,"/",2),"+",4)]$.

Similarly, the SET source tree structure:

$[[A,7],[B,9],[C,expr(C,+,2)]]$ is transformed into:

$[[D,7],[E,expr(9,"*",2)],[F,expr(F,+,2)]]$ and is simplified as:

$[[D,7],[E,18],[F,expr(F,+,2)]]$

Database replication uses the transformed WHERE and SET clauses to generate the following target SQL statement:

UPDATE TARGETAB1 SET $D=7,E=18,F=F+2$
  WHERE $D<1$ AND$(E=6$ OR $F>=(E/2+4))$

At 260, the target SQL statement is subsequently transmitted to the target DBMS, where it is executed.

Figure 3:
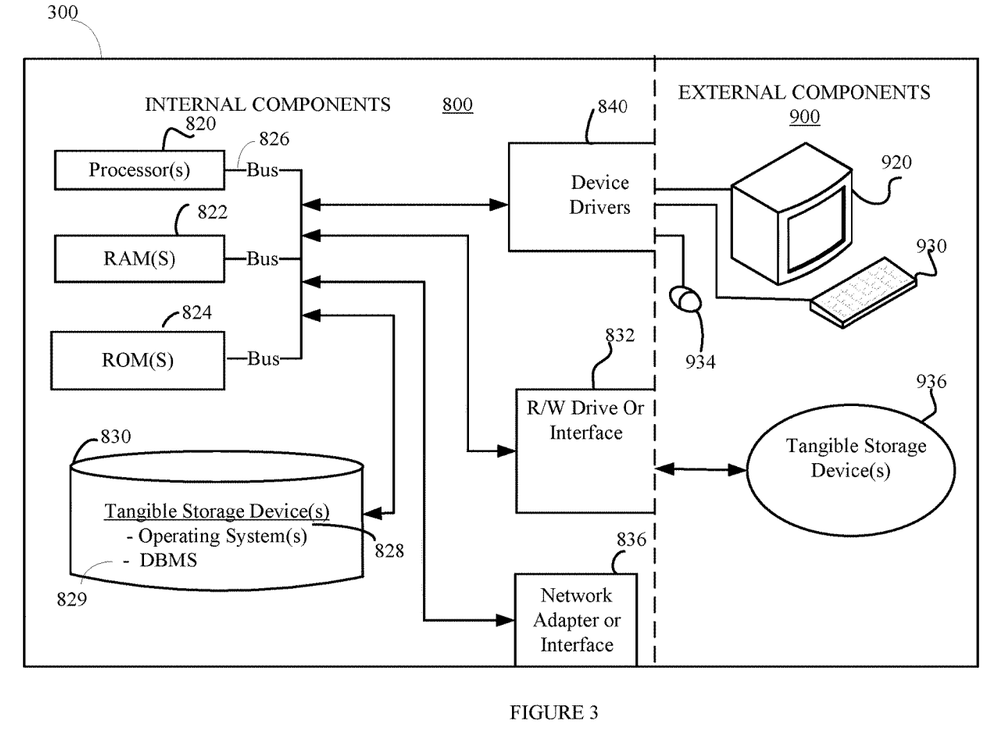
FIG. 3 is a schematic block diagram of hardware and software of the computer environment according to an embodiment of the process of FIG. 2.

FIG. 3 illustrates an exemplary computing device 300 applicable for executing the algorithm of FIG. 2. Computing device 300 may include respective sets of internal components 800 and external components 900 that together may provide an environment for a software application, such a DBMS 829. Each of the sets of internal components 800 includes one or more processors 820; one or more computer-readable RAMs 822; one or more computer-readable ROMs 824 on one or more buses 826; one or more operating systems 828; one or more software applications (e.g., DBMS 829) executing the method illustrated in FIG. 2; and one or more computer-readable tangible storage devices 830. The one or more operating systems 828 and DBMS modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS 829, and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A processor-implemented method for replicating structured query language (SQL) in a heterogeneous replication environment comprising:

receiving, by a database replication component of a database management system (DBMS), a delete or update first SQL statement that was executed on a source DBMS and is directed to one or more tables of a target DBMS having an architecture that is non-compatible with the source DBMS, being of different operating system architectures, different DBMS versions, different host server architectures, or different DBMS vendors;

evaluating whether to create a source tree structure from the received first SQL-statement based on complexity of the first SQL statement wherein the first SQL statement comprises: 1) a column in a source table not corresponding to a column in a target table; 2) the first SQL statement including a concatenation of columns; or 3) the first SQL statement including a user-defined function;

in response to creating the source tree structure, evaluating whether the source tree structure is transformable;

based on the source tree structure being transformable, transforming the source tree structure to a target tree structure, wherein the transforming comprises mapping one or more columns in the source tree structure to corresponding columns in at least one target table by substituting values associated with columns of the source table into corresponding columns of the target table, and wherein the values comprise constant data and expressions using other columns, the values being connected using relational operators, and grouped using brackets and parentheses, but when the source tree structure is not transformable, indicating to the database replication component to apply default row level replication strategy instead of performing data transformation; and generating a target SQL statement for execution at the target DBMS.

2. The method of claim 1, wherein the database replication executes the default row level replication strategy based on the database replication being unable to create the source tree structure from the first statement.

3. The method of claim 1, wherein the database replication uses a configurable heuristic of a number of rows affected by the target SQL statement to determine whether to execute the default row level replication strategy or to transform the first SQL statement for replication.

* * * * *